United States Patent
Sakamoto et al.

(10) Patent No.: US 7,049,021 B2
(45) Date of Patent: May 23, 2006

(54) CONDUCTIVE COMPOSITION FOR SOLID POLYMER TYPE FUEL CELL SEPARATOR, SOLID POLYMER TYPE FUEL CELL SEPARATOR, SOLID POLYMER TYPE FUEL CELL AND SOLID POLYMER TYPE FUEL CELL SYSTEM USING THE SEPARATOR

(75) Inventors: Arata Sakamoto, Osaka (JP); Hiroyuki Okazaki, Osaka (JP)

(73) Assignee: Osaka Gas Company Limited, Osaka (JP)

( * ) Notice: Subject to any disclaimer, the term of this patent is extended or adjusted under 35 U.S.C. 154(b) by 429 days.

(21) Appl. No.: 10/312,665

(22) PCT Filed: Jun. 29, 2001

(86) PCT No.: PCT/JP01/05662

§ 371 (c)(1),
(2), (4) Date: Dec. 26, 2002

(87) PCT Pub. No.: WO02/01660

PCT Pub. Date: Jan. 3, 2002

(65) Prior Publication Data

US 2003/0180597 A1   Sep. 25, 2003

(30) Foreign Application Priority Data

Jun. 29, 2000   (JP) ............................. 2000-196860

(51) Int. Cl.
*H01M 8/02*   (2006.01)
*H01B 1/24*   (2006.01)
(52) U.S. Cl. ........................... 429/34; 429/39; 264/122
(58) Field of Classification Search .................. 429/34, 429/38, 39
See application file for complete search history.

(56) References Cited

U.S. PATENT DOCUMENTS

| | | | | |
|---|---|---|---|---|
| 3,716,609 A | * | 2/1973 | Trocciola et al. | 264/122 |
| 3,971,748 A | * | 7/1976 | Wang et al. | 524/1 |
| 4,301,222 A | * | 11/1981 | Emanuelson et al. | 429/251 |
| 4,360,485 A | * | 11/1982 | Emanuelson et al. | 264/29.5 |
| 4,913,706 A | * | 4/1990 | Luoma et al. | 29/623.5 |

FOREIGN PATENT DOCUMENTS

| | | |
|---|---|---|
| JP | 59-213610 | 12/1984 |
| JP | 60-246568 | 12/1985 |
| JP | 62-260709 | 11/1987 |
| JP | 04-214072 | 8/1992 |
| JP | 10-334927 | 12/1998 |
| JP | 11-053943 | 2/1999 |
| JP | 11-354137 | 12/1999 |
| JP | 2000-017179 | 1/2000 |
| JP | 2000-040517 | 2/2000 |
| JP | 2000-090941 | 3/2000 |
| JP | 2001-052721 | 2/2001 |
| WO | WO 99/49530 | 9/1999 |

\* cited by examiner

*Primary Examiner*—Mark Ruthkosky
(74) *Attorney, Agent, or Firm*—Knobbe, Martens, Olson & Bear LLP

(57) ABSTRACT

1. A conductive composition for a polymer electrolyte fuel cell separator comprising:
   1) a conductive component composed of graphite particles and optionally fine graphite particles; and
   2) a thermoplastic resin and/or a thermosetting resin,
   3) the graphite particles having an average particle diameter D1 of 55 to 65 μm,
   4) the melt viscosity being $1 \times 10^2$ to $5 \times 10^3$ Pa·s at 320° C., and
   5) the weight ratio of (the graphite particles and optionally the fine graphite particles)/(the thermoplastic resin and/or the thermosetting resin) being 95/5 to 75/25.

18 Claims, 1 Drawing Sheet

CONDUCTIVE COMPOSITION FOR SOLID POLYMER TYPE FUEL CELL SEPARATOR, SOLID POLYMER TYPE FUEL CELL SEPARATOR, SOLID POLYMER TYPE FUEL CELL AND SOLID POLYMER TYPE FUEL CELL SYSTEM USING THE SEPARATOR

This application is the U.S. National Phase under 35 U.S.C. §371 of International Application PCT/JP01/05662, filed Jun. 29, 2001, which claims priority to Japanese Patent Application Nos. 2000-196860, filed Jun. 29, 2000. The International Application was published under PCI Article 21(2) in a language other than English.

TECHNICAL FIELD

The present invention relates to a conductive composition usable for manufacturing a separator for a solid polymer type fuel cell (polymer electrolyte fuel cell: PEFC), a polymer electrolyte fuel cell separator, a polymer electrolyte fuel cell using the separator, and a polymer electrolyte fuel cell system using the separator.

BACKGROUND ART

A polymer electrolyte fuel cell comprises a solid polymer membrane (Nafion, manufactured by E. I. du Pont de Nemours and Company; Dow membrane, manufactured by Dow Chemical Company; etc.) that functions as an electrolytic membrane, porous graphite papers disposed on both sides of the electrolytic membrane, and a platinum alloy catalyst serving as an electrode catalyst supported on the surface of the papers. The cell is so structured that a porous graphite plate having grooves as passageways for gas and a flat separator are arranged on each outer side of the graphite papers in this order, or a flat separator having grooves as passageways for gas on each outer side of the graphite papers.

Gas-impermeability to oxygen and hydrogen, electric conductivity, thermal conductivity, mechanical strength, acid resistance, and the like are required of the flat separators. In addition to the requirements of the flat separator, the separator having grooves is also required to have high dimensional accuracy for the gas passageways. Furthermore, the separators should be thin, because, for example, around 100 to 600 separators are layered to construct one fuel cell. Specifically, it is demanded that the number of bipolar separators used be reduced by making their thickest portions 2 mm or less and by forming grooves on both sides thereof, and it is also demanded that the thin portions thereof be made as thin as possible (for example, about 0.8 mm) by forming the grooves as deeply as possible.

A separator of this kind is manufactured in a manner such that a mixture of phenol resin; a binder made of a petroleum-based pitch or coal-based pitch or the like that exhibits a high carbonization yield; and carbon powder are molded into a flat plate. The resulting flat plate is subjected to carbonization or graphitization in a non-oxidizing atmosphere, obtaining a carbonaceous or graphite flat plate. Then, grooves are formed on the obtained plate by machining. For example, Japanese Unexamined Patent Publication No. 1992-214072 discloses a method to obtain a carbon material for a fuel cell, which comprises a step of molding a carbonaceous composition including a carbonizable or graphitizable binder, carbon fiber, and carbonaceous powder grains, wherein the carbonaceous powder grains composed of powder grains being average grain sizes of 25 to 75 µm, powder grains being 75 to 125 µm, and powder grains being 125 to 175 µm; and a step of graphitizing the resulting molded carbonaceous composition. This publication also discloses that the carbonaceous composition contains 10 to 75 parts by weight of carbon fiber and 50 to 150 parts by weight of carbonaceous powder grains, based on 100 parts by weight of binder. In the Example, a molded sheet having a thickness of 2 mm was graphitized.

However, when the carbonaceous composition is carbonized or graphitized, its gas-impermeability is degraded, and warping and cracks tend to appear on the carbon sheet material, reducing the yield. Furthermore, it is difficult to make the sheet thin while also improving the machining processability of the graphite carbon material. Moreover, forming grooves by machining a graphite carbon material makes the carbon material very expensive.

WO99/49530 proposes a method for manufacturing a separator for a fuel cell by subjecting a resin composition containing a non-carbonaceous resin and a conductive agent to injection molding or compression molding. Japanese Unexamined Patent Publication No. 1987-260709 discloses a carbon molded article that comprises 10 to 30 wt. % of a thermosetting resin and graphitized meso-carbon microbeads having a particle size of 50 µm or less. This publication also discloses that a thin sheet having a thickness of 0.8 mm was obtained.

Japanese Unexamined Patent Publication No. 1985-246568 discloses a method for manufacturing a ribbed separator for a fuel cell. The method comprises a step of press molding a mixture of 25 to 30 wt. % of a phenol resin and 70 to 75 wt. % of graphite powder under a temperature at which resin does not graphitize. This publication also discloses that a conductive plate having a thickness of 2 mm was obtained by using graphite powder classified to a particle size in the range of 100 to 325 mesh (about 150 to 44 µm). In the molding process for a ribbed molded article disclosed in the publication, it is necessary to have a resin amount of 25 wt. % to improve moldability, thereby obtaining a molded article having a volume electric resistance on the order of $10^{-2}$ Ω·cm.

Japanese Unexamined Patent Publication No. 1984-213610 discloses a carbon molded article constructed by 10 to 25 wt. % of a thermosetting resin and graphite powder, in which the aspect ratio of the graphite powder is 3 or less, the maximum grain size of graphite powder is 104 µm, 10 to 80% of the powder has a grain size of 50 µm or less, and the molded article has an electric specific resistance of 0.03 Ω·cm or less. In this publication, the aspect ratio is set to 3 or less by applying trituration, since oblate particles decrease moldability.

However, all of the compositions described above have insufficient moldability, and therefore, when the resin amount is reduced (for example, a composition having a resin amount of less than 25 wt. %), it becomes difficult to obtain a uniform molded article that is very thin (for example, a thickness of 2 mm or less) and provided with grooves, ribs, or manifolds. It is particularly difficult to obtain a thin and uniform molded article having yet thinner portions in bumps, dips, grooves, etc.

An object of the present invention is to provide a conductive composition, by which a thin molded article having a homogeneous constitution can be obtained, even when the molded article has a complicated structure such as bumps and dips or grooves that function as ribs, manifolds, etc., and to provide a polymer electrolyte fuel cell separator and a polymer electrolyte fuel cell using the separator.

Another object of the present invention is to provide a conductive composition that makes it possible to obtain a separator for a polymer electrolyte fuel cell that is excellent in gas-impermeability, electric conductivity, thermal conductivity, mechanical strength, acid resistance, and the like at a low cost without subjecting to a carbonization or graphitization process.

Still another object of the present invention is to provide a conductive composition that makes it possible to obtain a separator for a polymer electrolyte fuel cell and that has a high electric conductivity, thermal conductivity, and like excellent properties, and grooves (passageways for gas) with high dimensional accuracy by subjecting the composition to only a molding process and no a machining process, and to provide a separator for a polymer electrolyte fuel cell using the above-described composition and a polymer electrolyte fuel cell using the separator.

Yet another object of the present invention is to provide a conductive composition exhibiting high molding flowability and moldability even when the content of resin is reduced that makes it possible to obtain a molded article having a high conductivity, and to provide a separator for a polymer electrolyte fuel cell using the composition and a polymer electrolyte fuel cell using the separator.

DISCLOSURE OF THE INVENTION

In order to achieve the above-described objects, the present inventors examined extensively and found that, in respect to a conductive composition comprising resin(s) and graphite particles, the use of graphite particles having a specific average particle diameter can significantly enhance the moldability and flowability of the composition. This makes it possible to obtain a molded article having a homogeneous constitution, thinness, and high electric conductivity, even when the molded article has a complicated structure, such as a plate with groves, by subjecting the conductive composition only to a molding process. The present invention has been accomplished based on the above findings.

In other words, the present invention relates to a conductive composition for a polymer electrolyte fuel cell separator, a polymer electrolyte fuel cell separator, a polymer electrolyte fuel cell using the separator, and a fuel cell system using the separator as described below. The present specification also discloses a method for manufacturing a conductive molded article, wherein the method comprises a step of molding a conductive composition.

1. A conductive composition for a polymer electrolyte fuel cell separator comprising:
    1) a conductive component composed of graphite particles and optionally fine graphite particles; and
    2) a thermoplastic resin and/or a thermosetting resin,
    3) the graphite particles having an average particle diameter D1 of 55 to 65 μm,
    4) the melt viscosity being $1\times10^2$ to $5\times10^3$ Pa·s at 320° C., and
    5) the weight ratio of (the graphite particles and optionally the fine graphite particles)/(the thermoplastic resin and/or the thermosetting resin) being 95/5 to 75/25.

2. The conductive composition for a polymer electrolyte fuel cell separator according to Item 1, wherein the fine graphite particles have an average particle diameter $D2=D1\times0.1$ to $D1\times0.5$.

3. The conductive composition for a polymer electrolyte fuel cell separator according to Item 1, wherein a molded article having a thickness of 2 mm or less is obtainable.

4. The conductive composition for a polymer electrolyte fuel cell separator according to Item 1, wherein the thermoplastic resin is a thermoplastic engineering plastic.

5. The conductive composition for a polymer electrolyte fuel cell separator according to Item 1, wherein the thermoplastic resin is a poly(phenylene sulfide) resin.

6. A polymer electrolyte fuel cell separator obtainable by subjecting the conductive composition according to any one of Items 1 to 5 to injection molding.

7. A polymer electrolyte fuel cell separator obtainable by subjecting the conductive composition according to any one of Items 1 to 5 to compression molding.

8. The polymer electrolyte fuel cell separator according to Item 6 or 7, wherein the separator is a flat plate shaped molded article.

9. The polymer electrolyte fuel cell separator according to Claim 6 or 7, wherein the separator is a flat plate shaped molded article having a surface with one or more bumps, dips, or grooves.

10. The polymer electrolyte fuel cell separator according to Item 6 or 7, wherein the volume electric resistance in the thickness direction is 50 mΩ·cm or less.

11. A polymer electrolyte fuel cell using the polymer electrolyte fuel cell separator according to Item 6 or 7.

12. A polymer electrolyte fuel cell system using the polymer electrolyte fuel cell separator according to Item 6 or 7.

13. A method for manufacturing a polymer electrolyte fuel cell separator, wherein the method comprises a step of injection molding a molten mixture containing:
    1) a conductive component composed of graphite particles and optionally fine graphite particles; and
    2) a thermoplastic resin and/or a thermosetting resin,
    3) the graphite particles have an average particle diameter of 55 to 65 μm,
    4) the melt viscosity is $1\times10^2$ to $5\times10^3$ Pa·s at 320° C., and
    5) the weight ratio of (the graphite particles and optionally the fine graphite particles)/(the thermoplastic resin and/or the thermosetting resin) is in the range of 95/5 to 75/25.

14. A method for manufacturing a polymer electrolyte fuel cell separator, wherein the method comprises a step of compression molding a molten mixture comprising:
    1) a conductive component composed of graphite particles and optionally fine graphite particles; and
    2) a thermoplastic resin and/or a thermosetting resin,
    3) the graphite particles have an average particle diameter of 55 to 65 μm,
    4) the melt viscosity is $1\times10^2$ to $5\times10^3$ Pa·s at 320° C., and
    5) the weight ratio of (the graphite particles and optionally the fine graphite particles)/(the thermoplastic resin and/or the thermosetting resin) is in the range of 95/5 to 75/25.

In the present specification, the particle size distribution of the powder particles is indicated as the values measured by a laser diffraction method. Among the values in the distribution, those that are used fall in a cumulative frequency of 20%, 50%, 80% in the accumulative particle size distribution curve obtained by the measurement. Here, the particle size that falls in a cumulative frequency of 50% is represented by the symbol "D50%," which is referred to as an average particle diameter. The degree of the particle size distribution can be indicated by the ratio between the particle size that falls in a cumulative frequency of 20% (D20%) and the particle size that falls in a cumulative frequency of 80% (D80%). This ratio (D80%/D20%) is called the "uniformity ratio." A large value for the uniformity ratio indicates that the particles have a wide variety of sizes from large to small. A small value for the uniformity ratio indicates that the particles have nearly uniform particle sizes.

The melt viscosity is measured based on the test method for flow properties as defined in JIS K-7199, with the conditions of a shear strain ratio (or shear rate) of 1000/s at a molding temperature of, for example, 320° C. Note that the shear strain ratio is calculated from the flow rate of the tested material per unit of time based on JIS K-7199, with the ratio between the barrel diameter D' and capillary diameter d defined as D'/d=10.0.

BEST MODE FOR CARRYING OUT THE INVENTION

Figure 1:
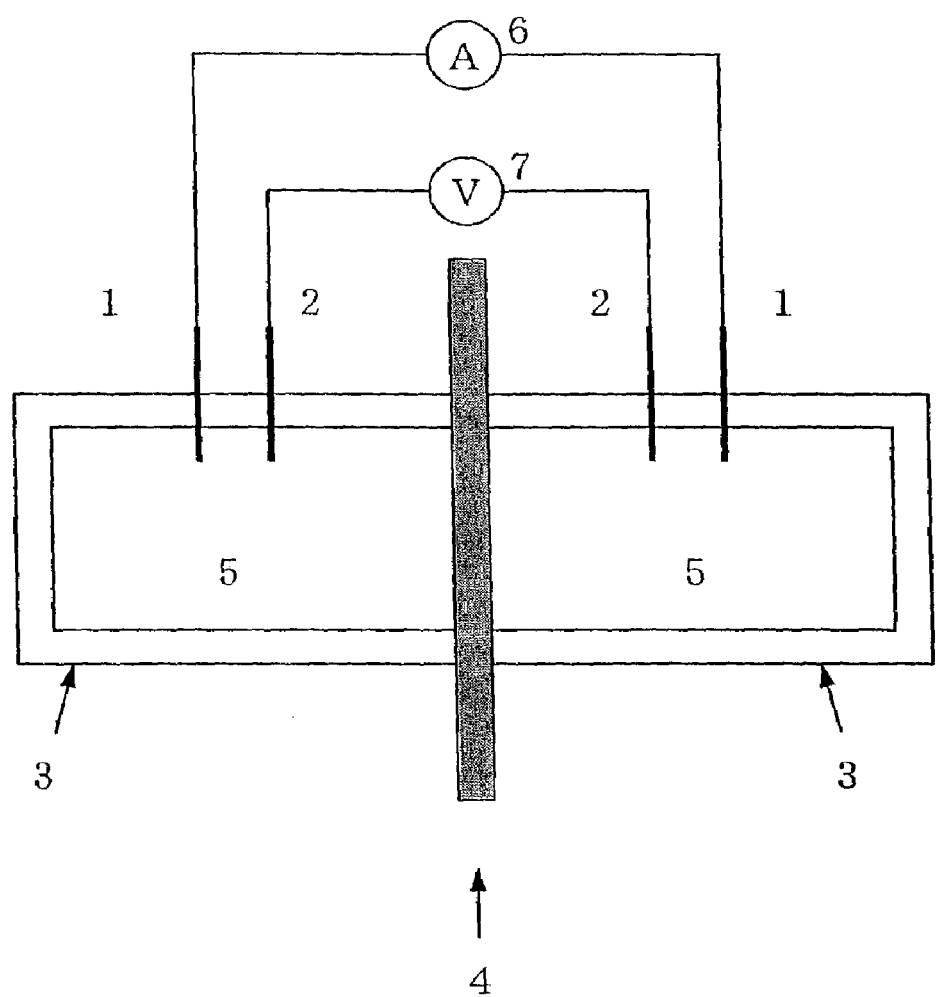
FIG. 1 shows the measuring principle of an apparatus used in the Examples for measuring the volume electric resistance in the thickness direction.

The present invention relates to a conductive composition for a polymer electrolyte fuel cell separator comprising:
1) a conductive component composed of graphite particles and optionally fine graphite particles; and
2) a thermoplastic resin and/or a thermosetting resin,
3) the graphite particles having an average particle diameter D1 of 55 to 65 μm,
4) the melt viscosity being $1\times10^2$ to $5\times10^3$ Pa·s at 320° C., and
5) the weight ratio of (the graphite particles and optionally the fine graphite particles)/(the thermoplastic resin and/or the thermosetting resin) being 95/5 to 75/25.

The melt viscosity of the conductive composition of the present invention can be selected, at a molding temperature of, for example, 320° C., from the range of about $1\times10^2$ to $5\times10^3$ Pa·s, and preferably about $1\times10^2$ to $4\times10^3$ Pa·s (for example, $3\times10^2$ to $4\times10^3$ Pa·s), and more preferably about $1\times10^2$ to $3\times10^3$ Pa·s (for example, $5\times10^2$ to $3\times10^3$ Pa·s).

Graphite Particles

The term "graphite particles" means particles consisting of a graphite structure or carbonaceous particles partly containing a graphite structure. It is preferable that the graphite particles have a high electric conductivity. Particles having a graphite structure with a high crystallinity are preferable as graphite particles.

The volume electric resistance of graphite particles is not limited; however, it is generally about $10^{-4}$ Ω·cm or less, preferably about $10^{-5}$ Ω·cm or less, and more preferably about $10^{-6}$ Ω·cm or less.

As graphite particles, for example, natural graphite, artificial graphite, and the like can be used. To be more specific, graphite particles made from a petroleum base or a coal base needle coke and the like can be used.

The shape of graphite particles is not limited and includes, for example, an amorphous structure such as plate-like graphite particles; a spherical shape, an elliptical shape, a polygonal shape (square, etc.), a rod shape, etc. Specific examples of plate-like graphite particles include flat particles, scale-like particles, layered particles, flaky particles, and the like. Usually, the shape of graphite particles is aspherical and amorphous (such as above-mentioned flat particles, scale-like particles, layered particles, flaky particles, and like plate-like graphite particles).

Artificial graphite generally has a crystal structure with La (110)> about 1000 Å, Lc (004)> about 1000 Å (particularly Lc (112)> about 100 Å).

The average particle diameter of the graphite particles is generally about 55 to 65 μm and preferably about 57 to 63 μm. By using graphite particles having such an average particle diameter, it is possible to obtain a conductive composition that exhibits an excellent flowability and injection moldability while maintaining high electric conductivity, even when the amount of resin is reduced.

The reasons for this are roughly explained below. In a mixture of resin and particles, when the average particle diameter of conductive particles becomes much smaller than 50 μm, the amount of resin required to cover the surfaces of the particles increases as the specific surface area increases. Accordingly, the viscosity of the composition rises and the moldability lowers. On the other hand, when the average particle diameter becomes much larger than 65 μm, the flow resistance generated by the mutual contact of particles becomes large and the viscosity of the composition becomes high. Furthermore, when the average particle diameter becomes much larger than 65 μm, the homogeneity of the constitution decreases, leading to problems such as the molded article having unevenly distributed strength, gas-impermeability, etc., or rough surfaces. Particularly, a molded article having a thickness of 2 mm or less has a high possibility of these problems. It is possible to obtain a conductive composition that exhibits a high flowability and excellent injection moldability, by using particles with a suitable diameter.

When molded into a separator or like molded article, the graphite particles form a conductive framework, and therefore a molded article exhibiting high electric conductivity can be obtained. Furthermore, the graphite particles can increase the effective cross-sectional area, which affects the electric conductivity, and have a small specific surface. Therefore, even when the amount of resin is greatly reduced, it is possible to obtain a molded article exhibiting low gas-permeability, high unification between graphite particles and resin, and high mechanical strength.

The graphite particles have a real density measured by a butanol displacement method generally in the range of about 2.1 or higher (for example, about 2.1 to 2.3), and preferably about 2.2 or higher (for example, about 2.2 to 2.3).

The BET specific surface area of graphite particles is generally 10 m²/g or less (for example, 1 to 5 m²/g), and preferably about 2 to 5 m²/g.

The oil absorption measured with the Δ method of JIS K-6221 (using dibutyl phthalate (DBP)) is generally about 60 to 75 ml/100 g, and preferably about 65 to 73 ml/100 g.

For the graphite particles having an average particle diameter of about 55 to 65 μm, it is effective to adjust the uniformity ratio thereof (D80%/D20%) to be, for example, about 5 or less (for example about 1 to 5), generally about 2 to 5 (for example, about 2.2 to 4.8), and preferably about 3 to 5.

The conductive composition for a polymer electrolyte fuel cell separator of the present invention may contain the fine graphite particles such that the melt viscosity falls in the range from $1\times10^2$ to $5\times10^3$ Pa·s at 320° C. The graphite particles having an average particle diameter D2=D1×0.1 to D1×0.5 and the like can be used as the fine graphite particles. The use of fine graphite particles can enhance the electric conductivity of a separator for a fuel cell.

The ratio of the graphite particles and the fine graphite particles is, based on the weight ratio, generally the former/the latter=about 100/0 to 60/40, preferably about 100/0 to 70/30, and more preferably about 100/0 to 80/20 (for example, about 100/0 to 75/25). A composition having a weight ratio of the graphite particles to the fine graphite particles of about 95/5 to 75/25, preferably about 90/10 to 75/25 (for example, about 85/15 to 75/25), and more preferably about 90/10 to 80/20 exhibits particularly high flowability or injection moldability, resulting in a molded article with higher electric conductivity.

The fine graphite particles content to the total weight of the composition is generally about 30 wt. % or less (for example, about 2 to 30 wt. %), preferably about 25 wt. % or less (for example, about 3 to 25 wt. %), and more preferably about 20 wt. % or less (for example, about 3 to 20 wt. %). Particularly preferable is about 5 to 20 wt. % (and even more preferable is about 10 to 20 wt. %).

The average particle diameter $D2$ of the fine graphite particles is generally $D2$= about $D1 \times 0.1$ to $D1 \times 0.5$, preferably about $D1 \times 0.1$ to $D1 \times 0.3$, and more preferably about $D1 \times 0.1$ to $D1 \times 0.2$.

The average particle diameter $D2$ can be suitably selected depending on the value of $D1$, and is generally about 5 to 25 μm, preferably about 7 to 20 μm, and more preferably about 8 to 12 μm.

As fine graphite particles, for example, natural graphite, artificial graphite, and the like can be used. The shape of the fine graphite particles is not limited and includes, for example, an amorphous shape such as a plate-like shape; a spherical shape, an elliptic shape, a polygonal shape (such as rectangular), a rod shape, etc. Specific examples of plate-like fine graphite particles include flat fine graphite particles, scale-like fine graphite particles, layered fine graphite particles, flaky fine graphite particles, etc. Among these, spherical (spherical fine graphite particles), scale-like (scale-like natural fine graphite particles), and flaky (flaky natural fine graphite particles) are preferable. The fine graphite particle types can be used singularly or in a combination of two or more.

Since the spherical graphite exhibits a high filling property in the space between coarse particles, they can effectively enhance electric conductivity. Furthermore, similar to spherical graphite, scale-like or flaky particles also exhibit a high filling property in the space between coarse particles and come in planar contact with the graphite particles (coarse particles) that function as a conductive framework, effectively enhancing the electric conductivity. Note that crystalline graphite particles having a large Lc or La in their crystal structure (for example, highly crystallized graphite particles having a well developed crystal structure) can be used as the fine graphite particles of which average particle diameter is referred to as $D2$.

Examples of spherical fine graphite particles include graphitized products of meso-carbon microbeads (hereinafter referred to as MCMB), spherically formed natural or artificial graphite, etc. MCMB are spheres (meso-phase spherule) having a structure similar to that of graphite, wherein the crystals are highly oriented. MCMB can be manufactured in a conventional manner. For example, MCMB can be manufactured by the methods disclosed in Japanese Examined Patent Publication No. 1989-27968, Japanese Unexamined Patent Publication No. 1989-242691, etc.

The flaky or scale-like natural fine graphite particles can be manufactured, for example, by subjecting high-crystalline natural graphite to an expansion process in a conventional manner (for example, by using sulfuric acid) and then pulverizing it with a jet mill or the like. The expansion process separates the layered structure of the graphite crystals between the layers. By pulverizing such a product, very flat and fine graphite particles (scale-like or flaky fine graphite particles) can be obtained. Such particles are easily compressible. The average particle diameter of the flaky natural fine graphite particles is optionally adjustable by controlling the pulverization process.

When the fine graphite particles are used, conductive components can be filled in high density for molding, making it possible to obtain molded articles that exhibit higher conductivity. The internal stress of the molded article is also lowered, thereby preventing warping or deformation of the molded article. Furthermore, the fine graphite particles can improve the flowability of the composition and enhance granulation stability and dispersibility.

The conductive composition of the present invention contains thermoplastic resin and/or thermosetting resin.

The thermoplastic resin and thermosetting resin used in the present invention are not limited as long as they are non-carbonaceous resins, which are not carbonized or graphitized. For example, non-carbonaceous resins that have been subjected to heat treatment at a temperature of about 700° C. or lower (preferably about 500° C. or lower), non-carbonaceous resin having molding hysteresis, and the like are usable.

Examples of thermosetting resins include phenol resins (resins formed by a reaction of phenols with formaldehydes, and optionally co-condensation components, etc.), furfural resins, epoxy resins (bisphenol A type epoxy resin, etc.), vinyl ester resins, unsaturated polyester resins, polyurethane resins, thermosetting acrylic resins, diallyl phthalate resins, silicone resins, amino resins (urea resins, melamine resins, etc.), and the like. These thermosetting resins can be used singularly or in a combination of two or more.

Examples of thermoplastic resins include polyolefin resins (polypropylene resin, ethylene-propylene copolymer, etc.), polyester resins (polyalkylene terephthalate, polyalkylene naphthalate and like aromatic homopolyesters or copolyesters thereof, polyarylate resins, liquid crystal polyester resins, etc.), polycarbonate resins (bisphenol A type polycarbonate resin, etc.), polystyrene resins (homopolymers of one member of styrene and like styrene-based monomers, or copolymers formed of two or more members thereof, etc.), acrylic resins (homopolymers of one member of methyl methacrylate and like acrylic monomers, or copolymers formed of two or more members thereof, etc.), polyamide resins (aliphatic polyamide (polyamide 6, polyamide 66, polyamide 610, etc.), aromatic polyamides (metaxylylenediamine-adipic acid copolymer MXD-6, etc.) and the like), polyarylene ether resins (polyphenylene ether resins), poly(arylene sulfide) resins (poly(phenylene sulfide) resins), polyaryl ether ketone resins (polyether ether ketone resins, etc.), polyether imide resins, polyaryl sulfone resins (polysulfone resin, polyether sulfone resin, etc.), fluorocarbon resins (homopolymers or copolymers of fluorine-containing monomers such as polychloro-trifluoroethylenel, polyvinylidene fluoride, polyvinyl fluoride, tetrafluoroethylene-hexafluoropropylene copolymer, tetrafluoroethylene-ethylene copolymer, tetrafluoroethylene-perfluoro(alkyl vinyl ether) copolymer, etc.), and the like. These thermoplastic resins can also be used singularly or in a combination of two or more.

Examples of preferable resins include ion-free resins, which do not contain ions of heavy metals and the like.

The functioning temperature of a polymer electrolyte fuel cell is generally around 80° C. Therefore, resins that have high durability under high temperatures are preferable. Examples of preferable resins include engineering plastics which resist deterioration due to hydrolysis or the like. Particularly preferable are thermoplastic engineering plastics (polyarylate resins, polyamide resins, polyarylene ether resins, polyarylene sulfide resins, polyaryl ether ketone resins, polyether imide resins, polyaryl sulfone resins, etc.). Among these, resins having a high chemical resistance and high strength are particularly preferable. Examples of preferable thermosetting resins include phenol resins (resol- or novolac-resin), epoxy resin, diallyl phthalate resin, etc. As the thermoplastic resins, in view of moldability, chemical resistance, durability, mechanical strength, and the like, poly(phenylene sulfide) resins, fluoro carbon resins, and the like are preferable.

Phenol resins include general resol resins, novolac resins, and copolymerized phenol resins: phenol resins formed by a reaction of phenols, aldehydes, and co-condensation components (urea, guanamine, melamine, furfural, nitrogen-containing compounds, etc.).

Poly(phenylene sulfide) resins are not limited as long as they have a poly(phenylene sulfide) framework and also include polymers homologous to poly(phenylene sulfide), for example, poly(phenylene sulfide ketone): PPSK, poly (phenylene sulfide sulfone): PPSS, poly(biphenylene sulfide): PBPS, and the like. The poly(phenylene sulfide) resins may or may not have a partial bridged structure. The poly(phenylene sulfide) resins may be a straight chain type having a straight chain structure (generally referred to as linear type or semi-linear type) or a branched type having a branched structure. Straight chain type poly(phenylene sulfide) resins are generally preferable. Furthermore, poly (phenylene sulfide) resins may contain substituent(s) (for example, a $C_{1-4}$ alkyl group and the like) in the benzene nucleus. The molecular weight of poly(phenylene sulfide) resins based on weight-average molecular weight is, for example, about $1 \times 10^4$ to $10 \times 10^4$ and preferably about $1.5 \times 10^4$ to $5 \times 10^4$.

The melt viscosity of the resins at the molding temperature is, for example, in the range of about 1 to 50 Pa·s (10 to 500 poises), preferably about 1 to 40 Pa·s (for example, 2 to 40 Pa·s), and more preferably about 1 to 30 Pa·s (for example, 2 to 30 Pa·s). Among these, usually resins having a melt viscosity of about 2 to 25 Pa·s and preferably about 2 to 20 Pa·s are advantageous. Using a resin having a low melt viscosity at the molding temperature allows not only a reduction in the resin amount but also improves electric conductivity even when the amount of resin used is the same. Note that the molding temperature can be suitably selected depending on the type of resin or the like. The molding temperature is generally about 100 to 350° C., (for example, a temperature higher than the melting temperature of the resin, such as 200 to 350° C.) and preferably about 220 to 330° C. The poly(phenylene sulfide) resins can be molded at a temperature, for example, of about 300 to 340° C. and preferably about 310 to 330° C. (for example, about 320° C.).

The molecular weight of the resin can be selected depending on the type of the resin, etc. The molecular weight of a thermosetting resin is generally about 500 to $5 \times 10^4$ and preferably about $0.1 \times 10^4$ to $1 \times 10^4$ based on weight-average molecular weight. The molecular weight of a thermoplastic resin is generally about $1 \times 10^4$ to $100 \times 10^4$ and preferably about $2 \times 10^4$ to $50 \times 10^4$ based on weight-average molecular weight.

The form of resin is not limited and includes liquid form, powder form, and the like. Resins are generally used in a powder granular form. The average particle diameter of a resin powder grain is not limited as long as homogeneity, moldability, and the like of the composition are not adversely affected, and is generally about 1 to 100 µm, preferably about 3 to 50 µm, and more preferably about 5 to 30 µm.

In the present invention, the graphite particles having a specific average particle diameter (preferably, graphite particles having a particle size of a specific uniformity ratio) are used, and therefore the specific surface area or oil absorption of graphite particles can be reduced. This makes it possible to obtain a molded article, such as a separator, having excellent flowability, moldability, unification, and mechanical strength, even when the content of resin is reduced. Furthermore, this also makes it possible to obtain separators exhibiting high electric conductivity and thermal conductivity without subjecting to a carbonization or graphitization process, in a manner that achieves high productivity and economy.

The ratio between (a) conductive components composed of the graphite particles and optionally fine graphite particles and (b) resin components composed of thermoplastic resin and/or thermosetting resin is not limited insofar as it does not adversely affect the electric conductivity, mechanical strength, thermal conductivity, and the like of the obtained molded article. The weight ratio between (a) conductive components and (b) resin components is, generally, the former/the latter= about 95/5 to 75/25, preferably about 87/13 to 73/27, and more preferably about 82/18 to 73/27.

The conductive compositions of the present invention may contain a binder for granulation. The binder is added depending on necessity during the granulation of the composition and the like. Examples of binders include sodium acrylate, polyvinyl alcohol, polyvinyl pyrrolidone and like resin binders; carboxymethyl cellulose, starch, and the like. Among these, sodium acrylate is preferable. Binders can be used singularly or in a combination of two or more. The amount of binder used (when the binder is an emulsion, the amount of solids) is not limited as long as the melt viscosity of the obtained resin composition is within a predetermined range. Based on 100 parts by weight of conductive components, it is generally about 0 to 10 parts by weight and preferably about 0 to 5 parts by weight.

In the conductive compositions of the present invention, if necessary, an additive, such as a coupling agent, a mold release agent, a lubricant, a plasticizer, a curing agent, a hardening prompter, a stabilizer, a surfactant, etc., can be added.

The form of the conductive composition is not limited and can be a powder mixture, or, in order to reduce the anisotropy of the molded article relative to its electric conductivity, thermal conductivity, etc., granular compositions (granulated materials (compounds)) can be used. When such granular compositions (for example, pellet-like compounds, granular compounds, etc., are used, homogeneous molded articles that have no resin segregation and have uniform properties can be obtained with high molding stability and reproducibility. The above described granular compositions (granulated materials) can be prepared in a conventional manner, such as a rotary granulation method, a mixing or agitation granulation method, a fluidized-bed granulation method, an extruding granulation method, a spray granulation method, and the like, where conductive particles, granular powder resin, and optionally other components are granulated. As an example of a simple granulation method, there is a method where a liquid or a binder solution is added dropwise or by spraying and the like, while mixing the conductive particles and resins.

The use of graphite particles together with fine graphite particles can make the granularity higher than the case where graphite particles are used alone. Namely, the fine graphite particles and the granular powder resin can be mixed beforehand, and then the resultant mixture (pre-dispersed substance) and the graphite particles can be granulated. By adding components other than the graphite particles beforehand, a homogeneous mixture is readily obtainable. For example, in the case of injection molding and the like are applied, the use of granulated material can prevent separation of the composition material, and therefore a molded article having a homogeneous constitution can be readily obtained. Furthermore, when compression molding and the like are applied, even if the graphite particles are highly oriented, the use of granular composition makes it possible to obtain molded articles, such as a separator exhibiting isotropic electric conductivity or thermal conductivity. Because the granulation disarranges orientation of the graphite particle.

The above-described pre-dispersed substance can be prepared by using the fine graphite particles and the powder resin, and it is also possible to prepare it by mixing the graphite particles and resin while crushing or pulverizing the mixture with a high shearing force.

The pre-dispersed substance can be prepared using a blender or a kneading machine (Henschel mixer, super mixer, kneader, extruder, etc.) in a dry blending/kneading method or a wet blending/kneading method.

The content of fine graphite particles in the pre-dispersed substance is generally about 0.1 to 10 parts by weight, preferably about 0.5 to 7 parts by weight, and more preferably about 1 to 5 parts by weight, based on 100 parts by weight resin.

The above-described pre-dispersed substance and the graphite particles can be grannulated by a conventional granulation method as described above. For example, while mixing the pre-dispersed substance and the graphite particles, a liquid or a binder solution can be added by dripping, spraying, etc.

Organic solvents (alcohols, esters, ketones, etc.) can be added as a liquid added during granulation; however, water is generally used.

Emulsions of various kinds of binders can be used as a binder solution. Examples of binders include sodium acrylate, polyvinyl alcohol, polyvinyl pyrrolidone and like resin binders; carboxymethyl cellulose, starch, etc. Among these, sodium polyacrylate is preferable. A binder can be used singularly or in a combination of two or more.

The amount of binder used (amount of solids content) is not limited, as long as the melt viscosity of the obtained resin composition is in a predetermined range. The amount is, based on 100 parts by weight of the conductive component, generally about 0 to 10 parts by weight, and preferably about 0 to 5 parts by weight. The amount of liquid (particularly, water) added is not limited and can be selected based on the granulation method. For example, when a rotary, mixing or agitation granulation method is applied, based on 100 parts by weight of powder mixture, the amount of liquid can be selected in the range from about 10 to 100 parts by weight.

The shape of the granular composition obtained by granulation (granulated materials) is not limited and can be spherical, elliptic, prismatic, or the like. The size of the granular composition (granulated materials) is, for example, an average particle diameter of about 0.2 to 3 mm, preferably about 0.3 to 2 mm, and more preferably about 0.4 to 1.5 mm.

The conductive composition of the present invention has high moldability, and it is possible to obtain a uniform molded article even if the article is very thin and has a complicated shape. Furthermore, the amount of resin used can be significantly reduced, and, in spite of using a non-baked (non-carbonated and non-graphitized) resin, it is possible to obtain a molded article having high electric conductivity. Therefore, the use of the conductive composition of the present invention makes it possible to obtain conductive molded articles of various shapes, such as flat plate molded articles (conductive plates, etc.), molded articles of complicated shapes and structures (flat plate molded articles and conductive plates having ribs, manifolds and like bumps/dips parts; grooves, etc.). The molded articles manufactured by using the conductive composition of the present invention can be suitably used as a polymer electrolyte fuel cell separator.

The thickness of the molded article is not limited and can be about 0.2 to 3 mm (for example, 0.8 to 2.5 mm). The use of the conductive composition of the present invention makes it possible to obtain a uniform plate, even when the content of the conductive particles is large and the content of resin is small, with a thickness of about 2.5 mm or less, preferably 2.0 mm or less (for example, about 0.5 to 2 mm), more preferably about 1.7 mm or less (for example, about 0.5 to 1.5 mm), still more preferably about 0.5 to 1.3 mm, and particularly preferably about 0.7 to 1.2 mm.

The use of the conductive composition of the present invention makes it possible to obtain not only a molded article having a volume electric resistance in the thickness direction of about 50 mΩ·cm or less (for example, about 1 to 50 mΩ·cm), preferably about 5 to 45 mΩ·cm, and more preferably about 10 to 40 mΩ·cm (for example, 20 to 40 mΩ·cm), but also a molded article having a volume electric resistance in the thickness direction of about 35 mΩ·cm or less (for example, about 10 to 35 mΩ·cm, preferably about 15 to 35 mΩ·cm).

The use of the conductive composition of the present invention makes it possible to obtain a molded article having a volume electric resistance in the plane direction of about 20 mΩ·cm or less (for example, about 1 to 15 mΩ·cm), and preferably about 1 to 10 mΩ·cm.

The conductive composition of the present invention makes it possible to obtain a molded article having excellent electric conductivity, moldability, and fluidity, even when the article is thin and has a complicated structure. Therefore, the conductive composition of the present invention is suitable for molding a separator for a fuel cell (or conductive plate) having grooves serving as passageways for gas, holes in manifolds, and the like. A separator for a fuel cell can be a flat plate molded article having flat surfaces or a flat plate molded article having grooves formed on at least one of the surfaces (preferably on both surfaces).

The thermal conductivity of the molded article (a plate or a separator (particularly, a separator for a polymer electrolyte fuel cell, etc.)) of the conductive composition of the present invention can be generally about 2 to 60 W/mK (for example, 3 to 60 W/mK), preferably about 5 to 60 W/mK, and more preferably about 10 to 60 W/mK.

Furthermore, the apparent density (bulk density) of the molded article can be selected from the range of about 1.1 to 2.2 g/cm$^3$, for example, about 1.7 to 2.1 g/cm$^3$, and preferably about 1.8 to 2.1 g/cm$^3$ (for example, 1.8 to 2 g/cm$^3$). Moreover, the bending strength of the molded article is generally about 30 to 200 MPa (for example, 30 to 150 MPa), and preferably about 50 to 200 MPa.

The polymer electrolyte fuel cell separator of the present invention can be obtained by molding the conductive composition of the present invention into a predetermined shape by a conventional molding method, for example, injection molding, compression molding (thermal-press molding), etc. It is possible to obtain a polymer electrolyte fuel cell separator by the method comprising the following steps and the like: mixing a conductive component composed of graphite particles having an average particle diameter of 55 to 65 μm and optionally fine graphite particles, together with a thermoplastic resin and a thermosetting resin, and binders if needed, adjusting the melt viscosity of the obtained mixture to be in the range from $1\times10^2$ to $5\times10^3$ Pa·s at 320° C., placing the resulting conductive composition in a mold, and molding. As a molding process, from the viewpoint of production cost and the like, injection molding is preferable.

When injection molding is employed, a molded article (flat plate) can be manufactured, for example, by melt-kneading a conductive composition composed of the graphite particles having a predetermined particle size and a resin (if necessary, preparing a pellet-like compound or granular compound and like compounds, and melt-kneading them) and by subjecting the resulting composition to injection molding at a molding temperature using a predetermined mold.

The injection pressure during injection molding is generally about 10 to 130 MPa and preferably about 10 to 100 MPa. The molding temperature (cylinder temperature) is generally about 100 to 350° C. (for example, a temperature that is the same as or higher than the melting temperature of the resin; for example, 200 to 350° C.), and preferably about 220 to 330° C. The temperature of the mold is generally about 180 to 320° C., and preferably about 200 to 310° C.

When compression molding is employed, it is possible to obtain a molded article (flat plate) by placing the above-mentioned conductive composition in a mold and subjecting it to heating and press molding under a pressure of about 2 to 200 MPa (for example, about 10 to 100 MPa), a molding temperature of about 100 to 350° C. (for example, a temperature that is the same as or higher than the melting temperature of the resin; for example, 200 to 350° C.), and preferably about 220 to 330° C.

The mold can be suitably selected in accordance with the shape of the surface of the separator. For example, it is possible to mold a flat separator having a smooth surface by using a mold having a smooth or flat surface, and it is also possible to mold a separator having at least one bumps and dips (particularly, a separator with grooves) using a mold with at least one bumps and dips (particularly, a mold with grooves having continuous bumps (salient portions) or grooves).

According to the methods of the present invention, molded articles can be manufactured in an economical manner such that only a molding process is conducted and a carbonization or graphitization process and machining process are omitted. Furthermore, the use of a mold having continuous bumps (salient portions) or grooves (in injection molding or compression molding, a mold having continuous bumps (salient portions) or grooves on at least one end of the cavity side and core side (particularly, on the core side)), this makes it possible to obtain a separator with grooves at low cost with high accuracy.

In the present invention, the use of a specific conductive composition enables even molded articles that have a complicated structure, such as bumps and dips or grooves to be molded uniformly and thinly. Furthermore, it is possible to obtain a conductive molded article (a separator for a polymer electrolyte fuel cell and like conductive plates) having excellent properties, including gas-impermeability, electric conductivity, thermal conductivity, mechanical strength, acid resistance, etc., without subjecting to a carbonization or graphitization process. It is also possible to obtain high electric conductivity, thermal conductivity, etc., and to form grooves, passageways for gas, and the like that have high dimensional accuracy, by subjecting to only a molding process and with no a machining process.

By using a molded article made of the composition of the present invention as a separator, a polymer electrolyte fuel cell can be manufactured. In addition to separators, a polymer electrolyte fuel cell comprises a solid polymer membrane that functions as an electrolytic membrane, an anode, a cathode, an electrode catalyst, and the like.

For the solid polymer membrane, a perfluorocarbonsulfonic acid membrane, a polytrifluorostyrene sulfonic acid membrane, a polystyrenesulfonic acid membrane, a phenolsulfonic acid membrane and like ion exchange resins having sulfonyl group as ion exchange groups can be used. Among these, a perfluorocarbonsulfonic acid membrane is preferable.

For the anode or cathode, a porous graphite or the like can be used.

For the electrode catalyst, a platinum alloy catalyst or the like can be used. The electrode catalyst can be supported on the surface of the electrode.

It is possible to obtain a polymer electrolyte fuel cell system by simply providing a hydrogen supply means, an oxygen supply means, and the like on a polymer electrolyte fuel cell. The method for connecting the hydrogen supply means to the polymer electrolyte fuel cell is not limited as long as the hydrogen is supplied to the anode of the fuel cell. The method for connecting the oxygen supply means to the polymer electrolyte fuel cell is also not limited as long as oxygen is supplied to the cathode of the fuel cell.

For the hydrogen supply means, there is a method wherein hydrogen is prepared by steam reformation using methane, liquefied natural gas, methanol and like hydrocarbon based fuels.

INDUSTRIAL APPLICABILITY

A molded article made of the conductive composition of the present invention can be suitably used as a fuel cell separator, and particularly as a polymer electrolyte fuel cell separator.

EXAMPLES

Hereinafter, the present invention will be explained in more detail with reference to Examples; however, the scope of the present invention is not limited to these Examples. The materials described below were used in the Examples and Comparative Examples.

(1) Graphite Particles

Needle coke was used as a starting material and graphitized at 2,800° C., followed by pulverization and classification to obtain the highly crystallized artificial graphite particles described below.

(1a) Graphite particles (Comparative Example) having an average particle diameter of 100 μm had the following properties: D20%=70 μm and D80%=150 μm, a uniformity ratio of D80%/D20%=2.1, a BET specific surface area of 2 $m^2/g$, and an oil absorption using dibutyl phthalate (DBP) of 65 ml/100 g. The graphite particles had a real density measured by a butanol displacement method of 2.24 based on JIS-R-7222.

(1b) Graphite particles (Comparative Example) having an average particle diameter of 70 μm had the following properties: D20%=28 μm and D80%=118 μm, a uniformity ratio of D80%/D20%=4.2, a BET specific surface area of 3 m$^2$/g, and an oil absorption using dibutyl phthalate (DBP) of 70 ml/100 g. The graphite particles had a real density measured by a butanol displacement method of 2.24 based on JIS-R-7222.

(1c) Graphite particles (Example) having an average particle diameter of 65 μm had the following properties: D20%=27 μm and D80%=115 μm, a uniformity ratio of D80%/D20%=4.3, a BET specific surface area of 3 m$^2$/g, and an oil absorption using dibutyl phthalate (DBP) of 70 ml/100 g. The graphite particles had a real density measured by a butanol displacement method of 2.24 based on JIS-R-7222.

(1d) Graphite particles (Example) having an average particle diameter of 60 μm had the following properties: D20%=24 μm and D80%=110 μm, a uniformity ratio of D80%/D20%=4.6, a BET specific surface area of 4 m$^2$/g, and an oil absorption using dibutyl phthalate (DBP) of 70 ml/100 g. The graphite particles had a real density measured by a butanol displacement method of 2.24 based on JIS-R-7222.

(1e) Graphite particles (Example) having an average particle diameter of 55 μm had the following properties: D20%=23 μm and D80%=103 μm, a uniformity ratio of D80%/D20%=4.5, a BET specific surface area of 4 m$^2$/g, and an oil absorption using dibutyl phthalate (DBP) of 70 ml/100 g. The graphite particles had a real density measured by a butanol displacement method of 2.24 based on JIS-R-7222.

(1f) Graphite particles (Comparative Example) having an average particle diameter of 50 μm had the following properties: D20%=20 μm and D80%=90 μm, a uniformity ratio of D80%/D20%=4.5, a BET specific surface area of 5 m$^2$/g, and an oil absorption using dibutyl phthalate (DBP) of 70 ml/100 g. The graphite particles had a real density measured by a butanol displacement method of 2.24 based on JIS-R-7222.

(1g) Graphite particles (Comparative Example) having an average particle diameter of 25 μm had the following properties: D20%=10 μm and D80%=42 μm, a uniformity ratio of D80%/D20%=4.2, a BET specific surface area of 8 m$^2$/g, and an oil absorption using dibutyl phthalate (DBP) of 80 ml/100 g. The graphite particles had a real density measured by a butanol displacement method of 2.24 based on JIS-R-7222.

(1h) Graphite particles (Comparative Example) having an average particle diameter of 15 μm had the following properties: D20%=7 μm and D80%=34 μm, a uniformity ratio of D80%/D20%=4.8, a BET specific surface area of 10 m$^2$/g, and an oil absorption using dibutyl phthalate (DBP) of 85 ml/100 g. The graphite particles had a real density measured by a butanol displacement method of 2.24 based on JIS-R-7222.

(2) Fine graphite particles for preparing a pre-dispersed substance (2a) For use as fine graphite particles to prepare a pre-dispersed substance that contains resin powder, natural graphite powder having an average particle diameter of 10 μm was obtained by pulverizing scale-like natural graphite with a jet mill.

(2b) For use as fine graphite particles to prepare a pre-dispersed substance that contains resin powder, artificial graphite powder having an average particle diameter of 10 μm was obtained by pulverizing artificial graphite with a jet mill.

(3) Resin (3a) Semi-linear poly(phenylene sulfide) resin (a melt viscosity of 30 Pa·s (300 ps) at 320° C., a weight-average molecular weight of 28,000 to 35,000) was used. The average particle diameter of this resin powder is 20 μm.

(3b) Semi-linear poly(phenylene sulfide) resin (a melt viscosity of 5 Pa·s (50 ps) at 320° C., a weight-average molecular weight of 18,000 to 25,000) was used. The average particle diameter of this resin powder is 20 μm.

Examples 1 to 3 and Comparative Examples 1 to 4

(Resin Pre-dispersed Substance)

The natural fine graphite particles (2a) and poly(phenylene sulfide) resin powder (3b) having the ratios listed in Table 1 were placed in a high-speed rotary mixer and mixed while being disintegrated for 10 minutes to produce pre-dispersed substances having resin powder uniformly dispersed therein.

(Granulation)

The pre-dispersed substance obtained in the above process, 100-μm-diameter artificial graphite particles (1a), 70-μm-diameter artificial graphite particles (1b), 65-μm-diameter artificial graphite particles (1c), 60-μm-diameter artificial graphite particles (1d), 55-μm-diameter artificial graphite particles (1e), and 50-μm-diameter artificial graphite particles (1f) or 25-μm-diameter artificial fine graphite particles (1g), each having the ratio as listed in Table 1, were placed in a rotary granulation apparatus ("Omni-mixer" manufactured by Chiyoda Technical & Industrial Co., Ltd.). The mixture was subjected to wet granulation by adding water dropwise or by spraying while stirring at the speed of 120 rpm. The amount of water added was adjusted in the range of 40 to 50 parts by weight based on 100 parts by weight of total material (powder mixture). The mode value of diameter of the granulized material was measured using JIS standard sieves of different mesh size (opening of sieve: 2.36 mm, 1.7 mm, 1.18 mm, 0.85 mm, 0.6 mm, and 0.42 mm) stacked one on the other. The mode value of diameter was 0.85 mm to 0.42 mm and the particles of this size constituted 60 to 95 wt. % of the total granulated material.

(Molding)

Injection molding was performed using an injection mold with outer dimensions of 20 cm×23 cm×2 mm. On both surfaces of the mold, 44 parallel grooves (width: 2 mm, length: 19 cm, depth: 0.5 mm, interval of grooves: 2 mm) were formed in an area of 18 cm×20 cm (active area). The use of such a mold makes it possible to obtain a molded article having predetermined grooves on both surfaces. The injection molding machine having a maximum clamping force of 300 t, and a maximum injection pressure of 1 t/cm$^2$ was used.

The pellet-shaped granular composition (granulated material) thus obtained was placed in a feeder and molded under the conditions of a mold temperature of 300° C., an injection pressure of 400 to 1000 kg/cm$^2$ (40 to 100 MPa), and a molding temperature (cylinder temperature) of 320° C. If it was possible to complete injection molding, the molded substance was then cooled to produce a molded article having grooves. The results are listed in Table 1.

(Volume Electric Resistance)

By machining and abrading the grooves formed on both surfaces of the molded article, a 10 cm×10 cm flat plate was obtained from the grooved area. Using this flat plate, the electrical resistanc in the thickness direction was measured by the four-terminal method employing the mercury electrode method described below. As shown in FIG. 1, resin cups (3) each comprising a current terminal (2) and a voltage terminal (1) were pressed onto both surfaces of the flat-plate specimen (4), and then the insides of both cups were filled with mercury (5). The voltage drop generated between the voltage terminals was measured using a voltmeter (7), when 120 mA of current was applied to the current terminals from a constant-current generator (6). The electrical resistanc in the thickness direction was obtained from the following formula:

$$R=(V\times S)/(I\times t)$$

[wherein, R represents electrical resistanc in the thickness direction (Ω·cm), V represents the voltage drop generated between the voltage terminals (V), S represents the contact area of mercury (cm$^2$), I represents current (A), and t represents the thickness of the specimen (cm).]

The volume electric resistance in the plane direction was measured based on JIS-K-6911.

15-μm-diameter artificial fine graphite particles (1h) having the ratio listed in Table 2 were placed in a mixer and mixed for 10 minutes to prepare a dispersed substance having the resin powder uniformly dispersed therein.

The dispersed substance prepared above was placed in a rotary granulation apparatus ("Omni-mixer" manufactured by Chiyoda Technical & Industrial Co., Ltd.) and subjected to wet granulation by adding water dropwise or by spraying, while stirring at the speed of 120 rpm. The amount of water added was adjusted in the range of 40 to 50 parts by weight based on 100 parts by weight of total material (powder mixture). The mode value of diameter of the granulized material was measured using JIS standard sieves of different mesh size (opening of sieve: 2.36 mm, 1.7 mm, 1.18 mm, 0.85 mm, 0.6 mm, and 0.42 mm) stacked one on the other. The mode value of diameter was 0.85 mm to 0.42 mm and the particles of this size constituted 60 to 95 wt. % of the total granulated material.

(Molding)

Using a mold (outer dimensions: 20 cm×23 cm), a plate having grooves formed on both surfaces was prepared by compression molding. On both surfaces of the mold, 44 parallel grooves (width: 2 mm, length: 19 cm, depth: 0.5 mm, interval of grooves: 2 mm) were formed. The use of such a mold makes it possible to obtain a molded article

TABLE 1

| | Comp. Ex. 1 | Comp. Ex. 2 | Example 1 | Example 2 | Example 3 | Comp. Ex. 3 | Comp. Ex. 4 |
|---|---|---|---|---|---|---|---|
| Graphite particles 100 μm (parts by weight) | 65 | | | | | | |
| Graphite particles 70 μm (parts by weight) | | 65 | | | | | |
| Graphite particles 65 μm (parts by weight) | | | 65 | | | | |
| Graphite particles 60 μm (parts by weight) | | | | 65 | | | |
| Graphite particles 55 μm (parts by weight) | | | | | 65 | | |
| Graphite particles 50 μm (parts by weight) | | | | | | 65 | |
| Graphite particles 25 μm (parts by weight) | | | | | | | 65 |
| Scale-like natural fine graphite particles (parts by weight) | 15 | 15 | 15 | 15 | 15 | 15 | 15 |
| PPS resin (parts by weight) | 20 | 20 | 20 | 20 | 20 | 20 | 20 |
| Molding pressure (kg/cm$^2$) | Un-moldable | Un-moldable | 650 | 450 | 700 | Un-moldable | Un-moldable |
| Thickness (mm) | — | — | 2.00 | 2.00 | 2.00 | — | — |
| Bulk density (g/cm$^3$) | — | — | 1.96 | 1.97 | 1.96 | — | — |
| Volume electric resistance in the thickness direction (mΩ·cm) | — | — | 27.8 | 31.3 | 33.5 | — | — |
| Melt viscosity of the composition (320° C., × 10$^3$ Pa·s) | 1.82 | 1.79 | 1.16 | 0.85 | 1.24 | 2.92 | 8.55 |

Note: "Unmoldable" means injection molding could not be achieved even when the molding pressure exceeded 1200 kg/cm$^2$.

Examples 4 to 6 and Comparative Examples 5 to 8
(Particle Diameter of Conductive Particles)

(Granulation)

Poly(phenylene sulfide) resin powder (3a) and 100-μm-diameter artificial graphite particles (1a), 70-μm-diameter artificial graphite particles (1b), 65-μm-diameter artificial graphite particles (1c), 60-μm-diameter artificial graphite particles (1d), 55-μm-diameter artificial graphite particles (1e), 50-μm-diameter artificial graphite particles (1f), or having predetermined grooves on both surfaces. The pellet-shaped granular composition (granulated material) (100 g) that was obtained as described above was placed in the mold and molded under the conditions of a molding pressure of 500 kg/cm$^2$ (50.0 MPa) and a temperature of 320° C. for 10 minutes. After cooling, the thickness, bulk density, and electric resistances (volume electric resistance) in the plane direction and the thickness direction of the plate-like molded article (a 20 cm×23 cm rectangle) were measured. The electric resistances in the thickness direction and the plane direction were measured in the same manner as in Example 1. Furthermore, the melt viscosity of the composition was measured. Table 2 shows the results and the appearance of the obtained molded articles.

Note that a thin molded article having a thickness of 0.5 mm or greater and less than 2 mm can be readily obtained in the same manner as described above except that the material input is reduced to a predetermined amount.

and stirred at the speed of 120 rpm for wet granulation in the same manner as in Example 4 described above. The obtained pellet-shaped granular composition (granulated material) was subjected to heating and compressing formation in the same manner as in Examples 4 to 6 described above to prepare a plate-like molded article (a 20 cm×23 cm rectangular). The thickness, bulk density, and volume electric resistances in the thickness direction and the plane direction

TABLE 2

|  | Comp. Ex. 5 | Comp. Ex. 6 | Example 4 | Example 5 | Example 6 | Comp. Ex. 7 | Comp. Ex. 8 |
|---|---|---|---|---|---|---|---|
| Graphite particles 100 μm (parts by weight) | 80 | | | | | | |
| Graphite particles 70 μm (parts by weight) | | 80 | | | | | |
| Graphite particles 65 μm (parts by weight) | | | 80 | | | | |
| Graphite particles 60 μm (parts by weight) | | | | 80 | | | |
| Graphite particles 55 μm (parts by weight) | | | | | 80 | | |
| Graphite particles 50 μm (parts by weight) | | | | | | 80 | |
| Graphite particles 15 μm (parts by weight) | | | | | | | 80 |
| PPS resin (parts by weight) | 20 | 20 | 20 | 20 | 20 | 20 | 20 |
| Melt viscosity of the composition (320° C., × 10³ Pa · s) | 4.00 | 3.95 | 4.90 | 3.83 | 3.81 | 5.11 | 26.1 |
| Thickness (mm) | 2.0 | 2.1 | 2.0 | 2.0 | 2.0 | 2.0 | 2.0 |
| Bulk density (g/cm³) | 1.94 | 1.96 | 1.96 | 1.96 | 1.97 | 1.94 | 1.96 |
| Volume electric resistance in the thickness direction (mΩ · cm) | 25.4 | 25.7 | 30.0 | 33.4 | 35.2 | 50.1 | 54.5 |
| Volume electric resistance in the plane direction (mΩ · cm) | 5.50 | 5.53 | 6.33 | 6.37 | 6.21 | 8.74 | 9.46 |
| Appearance of the molded article | Rough surface occurred partially & Chipped grooves | Rough surface occurred partially & Chipped grooves | Excellent | Excellent | Excellent | Rough surface occurred partially | Rough surface occurred partially |

Examples 7 to 9 and Comparative Examples 9 to 11 (Ratio Between the Conductive Particles and Resin)

Poly(phenylene sulfide) resin powder (3a) and 60-μm-diameter artificial graphite particles (1d) were placed in a mixer in the ratio listed in Table 3 and mixed for 10 minutes to prepare a dispersed substance having the resin powder uniformly dispersed therein. The dispersed substance was placed in a rotary granulation apparatus ("Omni-mixer" manufactured by Chiyoda Technical & Industrial Co., Ltd.)

of the molded article were measured. The electric resistances in the thickness direction and the plane direction were measured in the same manner as in Example 1. The melt viscosity of the composition was also measured. The results and appearance of the obtained molded articles are shown in Table 3.

Note that a thin molded article having a thickness of 0.5 mm or greater and less than 2 mm can be readily obtained in the same manner as described above except that the material input is reduced to a predetermined amount.

TABLE 3

|  | Comp. Ex. 9 | Comp. Ex. 10 | Example 7 | Example 8 | Example 5 | Example 9 | Comp. Ex. 11 |
|---|---|---|---|---|---|---|---|
| Graphite particles 60 μm (parts by weight) | 90 | 87 | 85 | 82 | 80 | 75 | 70 |
| PPS resin (parts by weight) (Melt viscosity was 30 Pa · s at 320° C.) | 10 | 13 | 15 | 18 | 20 | 25 | 30 |
| Melt viscosity of the composition | 7.50 | 5.62 | 5.00 | 4.42 | 3.83 | 2.40 | 1.38 |
| Thickness (mm) | 2.0 | 2.0 | 2.0 | 2.0 | 2.0 | 2.0 | 2.1 |
| Bulk density (g/cm³) | 2.02 | 2.01 | 2.00 | 1.98 | 1.96 | 1.95 | 1.85 |
| Volume electric resistance in the thickness direction (mΩ · cm) | 26.0 | 29.5 | 30.8 | 32.3 | 33.4 | 48.1 | 87.7 |

TABLE 3-continued

|  | Comp. Ex. 9 | Comp. Ex. 10 | Example 7 | Example 8 | Example 5 | Example 9 | Comp. Ex. 11 |
|---|---|---|---|---|---|---|---|
| Volume electric resistance in the plane direction (mΩ · cm) | 4.63 | 5.03 | 5.98 | 6.39 | 6.37 | 9.2 | 21.6 |
| Appearance of the molded article | Rough surface occurred partially & Chipped grooves | Rough surface occurred partially & Chipped grooves | Excellent | Excellent | Excellent | Excellent | Excellent |

Examples 10 to 15

(Resin pre-dispersed Substance)

Artificial fine graphite particles (2b) and poly(phenylene sulfide) resin powder (3b) having the ratios listed in Table 4 were placed in a high-speed rotary mixer and mixed for 10 minutes to prepare pre-dispersed substances having the resin powder uniformly dispersed therein.

The pre-dispersed substance prepared above and 60-μm-diameter artificial graphite particles (1d) having the ratio listed in Table 4 were placed in a rotary granulation apparatus ("Omni-mixer" manufactured by Chiyoda Technical & Industrial Co., Ltd.) and subjected to wet granulation in the same manner as in Examples 4 to 6 described above. The obtained pellet-shaped granular composition (granulated material) was subjected to heating and pressing molding in the same manner as in Examples 4 to 6, to obtain a plate-like molded article (a 20 cm×23 cm rectangular). The thickness, bulk density, and volume electric resistances in the thickness direction and the plane direction of the molded article were measured. The volume electric resistances in the thickness direction and the plane direction were measured in the same manner as in Example 1. The melt viscosity of the composition was also measured. The results and the appearances of the obtained molded articles are shown in Table 4.

Note that a thin molded article having a thickness of 0.5 mm or greater and less than 2 mm can be readily obtained in the same manner as described above except that the material input is reduced to a predetermined amount.

The invention claimed is:

1. A conductive composition for a polymer electrolyte fuel cell separator comprising:
   1) a conductive component composed of non-fine graphite particles and fine graphite particles; and
   2) a thermoplastic resin and/or a thermosetting resin,
   3) the non-fine graphite particles having an average particle diameter D1 of 55 to 65 μm,
   4) the melt viscosity being $1 \times 10^2$ to $5 \times 10^3$ Pa·s at 320° C.,
   5) the weight ratio of (the non-fine graphite particles and the fine graphite particles)/(the thermoplastic resin and/or the thermosetting resin) being from 95/5 to 75/25,
   6) the fine graphite particles having an average particle diameter 5.5–32.5 μm, and
   7) the weight ratio of the non-fine graphite particles to the fine graphite particles being 95/5 to 75/25.

2. The conductive composition for a polymer electrolyte fuel cell separator according to claim 1, in the form of a molded article having a thickness of 2 mm or less obtainable.

3. The conductive composition for a polymer electrolyte fuel cell separator according to claim 1, wherein the thermoplastic resin is a thermoplastic engineering plastic.

4. The conductive composition for a polymer electrolyte fuel cell separator according to claim 1, wherein the thermoplastic resin is a poly(phenylene sulfide) resin.

5. A polymer electrolyte fuel cell separator obtainable by subjecting the conductive composition according to claim 1 to injection molding.

6. A polymer electrolyte fuel cell separator obtainable by subjecting the conductive composition according to claim 1 to compression molding.

TABLE 4

|  | Example 10 | Example 11 | Example 12 | Example 15 | Example 14 | Example 15 |
|---|---|---|---|---|---|---|
| Graphite particles 60 μm (parts by weight) | 75 | 70 | 67 | 65 | 60 | 60 |
| Artificial graphite fine particles 10 μm (parts by weight) | 5 | 10 | 15 | 15 | 20 | 15 |
| PPS resin (parts by weight) | 20 | 20 | 18 | 20 | 20 | 25 |
| Melt viscosity of the composition (320° C., × $10^3$ Pa · s) | 1.50 | 1.47 | 1.21 | 0.84 | 1.68 | 1.07 |
| Thickness (mm) | 2.0 | 2.0 | 2.0 | 2.1 | 2.00 | 2.1 |
| Bulk density (g/cm³) | 1.96 | 1.97 | 1.97 | 1.96 | 2.00 | 1.90 |
| Volume electric resistance in the thickness direction (mΩ · cm) | 33.8 | 35.2 | 27.4 | 31.3 | 34.7 | 49.5 |
| Volume electric resistance in the plane direction (mΩ · cm) | 7.11 | 7.5 | 5.99 | 6.95 | 6.86 | 13.9 |
| Appearance of the molded article | Excellent | Excellent | Excellent | Excellent | Excellent | Excellent |

7. The polymer electrolyte fuel cell separator according to claim 5, wherein the separator is a flat plate shaped molded article.

8. The polymer electrolyte fuel cell separator according to claim 5, wherein the separator is a flat plate shaped molded article having a surface with one or more bumps, dips, or grooves.

9. The polymer electrolyte fuel cell separator according to claim 5, wherein the volume electric resistance in the thickness direction is 50 mΩ·cm or less.

10. A polymer electrolyte fuel cell using the polymer electrolyte fuel cell separator according to claim 5.

11. A polymer electrolyte fuel cell system using the polymer electrolyte fuel cell separator according to claim 5.

12. A method for manufacturing a polymer electrolyte fuel cell separator, wherein the method comprises a step of injection molding a molten mixture containing:
  1) a conductive component composed of non-fine graphite particles and fine graphite particles; and
  2) a thermoplastic resin and/or a thermosetting resin,
  3) the non-fine graphite particles have an average particle diameter of 55 to 65 μm,
  4) the melt viscosity is $1\times10^2$ to $5\times10^3$ Pa·s at 320° C.,
  5) the weight ratio of (the non-fine graphite particles and the fine graphite particles)/(the thermoplastic resin and/or the thermosetting resin) is in the range of from 95/5 to 75/25,
  6) the fine graphite particles having an average particle diameter 5.5–32.5 μm, and
  7) the weight ratio of the non-fine graphite particles to the fine graphite particles being 95/5 to 75/25.

13. A method for manufacturing a polymer electrolyte fuel cell separator, wherein the method comprises a step of compression molding a molten mixture comprising:
  1) a conductive component composed of non-fine graphite particles and fine graphite particles; and
  2) a thermoplastic resin and/or a thermosetting resin,
  3) the non-fine graphite particles have an average particle diameter of 55 to 65 μm,
  4) the melt viscosity is $1\times10^2$ to $5\times10^3$ Pa·s at 320° C.,
  5) the weight ratio of (the non-fine graphite particles and the fine graphite particles)/(the thermoplastic resin and/or the thermosetting resin) is in the range of from 95/5 to 75/25,
  6) the fine graphite particles having an average particle diameter 5.5–32.5 μm, and
  7) the weight ratio of the non-fine graphite particles to the fine graphite particles being 95/5 to 75/25.

14. The polymer electrolyte fuel cell separator according to claim 6, wherein the separator is a flat plate shaped molded article.

15. The polymer electrolyte fuel cell separator according to claim 6, wherein the separator is a flat plate shaped molded article having a surface with one or more bumps, dips, or grooves.

16. The polymer electrolyte fuel cell separator according to claim 6, wherein the volume electric resistance in the thickness direction is 50 mΩ·cm or less.

17. A polymer electrolyte fuel cell using the polymer electrolyte fuel cell separator according to claim 6.

18. A polymer electrolyte fuel cell system using the polymer electrolyte fuel cell separator according to claim 6.

* * * * *